(12) United States Patent
Chen et al.

(10) Patent No.: US 7,397,917 B2
(45) Date of Patent: Jul. 8, 2008

(54) METHOD AND APPARATUS FOR GENERATING A CRYPTOGRAPHIC KEY

(75) Inventors: Liqun Chen, Bristol (GB); David Soldera, Bristol (GB); Keith Alexander Harrison, Woodcroft Chepstow Monmouthshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 896 days.

(21) Appl. No.: 10/613,750

(22) Filed: Jul. 3, 2003

(65) Prior Publication Data

US 2004/0131191 A1    Jul. 8, 2004

(30) Foreign Application Priority Data

Jul. 5, 2002    (GB) .............................. 0215524.0

(51) Int. Cl.
  *H04K 1/00*    (2006.01)
  *H04L 9/00*    (2006.01)
  *H04L 9/30*    (2006.01)
(52) U.S. Cl. .......................... 380/44; 380/30; 380/286
(58) Field of Classification Search .................. 380/30, 380/44, 286
   See application file for complete search history.

(56) References Cited

U.S. PATENT DOCUMENTS

| | | | |
|---|---|---|---|
| 5,272,755 A | 12/1993 | Miyaji et al. ................. 380/30 |
| 5,917,911 A | 6/1999 | Dabbish et al. ............... 380/21 |
| 2002/0049910 A1 | 4/2002 | Salomon et al. ............. 713/193 |
| 2002/0078354 A1 | 6/2002 | Sandhu et al. .............. 713/171 |
| 2003/0081785 A1* | 5/2003 | Boneh et al. ................. 380/277 |
| 2003/0115457 A1 | 6/2003 | Wildish et al. .............. 713/157 |
| 2003/0179885 A1 | 9/2003 | Gentry et al. ................ 380/277 |
| 2003/0182554 A1 | 9/2003 | Gentry et al. ................ 713/171 |

FOREIGN PATENT DOCUMENTS

| | | |
|---|---|---|
| EP | 0 876 028 A2 | 11/1998 |
| EP | 1 130 844 A2 | 9/2001 |
| EP | 1 185 027 A2 | 3/2002 |
| WO | 00/05836 | 2/2000 |
| WO | 03/017559 A2 | 2/2003 |

OTHER PUBLICATIONS

Gentry, Craig et al. "Hierarchical ID-Based Cryptography", ASIACRYPT 2002.*

(Continued)

*Primary Examiner*—Kambiz Zand
*Assistant Examiner*—Michael J. Simitoski
(74) *Attorney, Agent, or Firm*—Ladas & Parry, LLP (57) ABSTRACT

A method and apparatus are provided for generating a cryptographic key from multiple data sets each related to a respective association of a trusted party and user identity. The cryptographic key is, for example, one of an encryption key, a decryption key, a signature key and a verification key, and is preferably generated by applying Tate or Weil bilinear mappings to the data sets. At least two of the data sets may relate to different user identities and/or different trusted authorities. Where multiple trusted authorities are involved, these authorities may be associated with different elements to which the bilinear mapping can be applied, each trusted authority having an associated public key formed from its associated element and a secret of that trusted authority.

39 Claims, 3 Drawing Sheets

| Embodiment | Key Type | Identity Element | TA Element | Session Element | General Form |
|---|---|---|---|---|---|
| First | Encryption "Enc" | $Q_{ID_i}$ Public | $R_{TA_j}$ Public | $r$ Private | $\hat{t}(R_{TA_j}, rQ_{ID_i})$ |
| | Decryption "Dec" | $S_i$ Private $Q_{ID_i}$ in $S_i$ | $s_j$ in $S_i$ | $U$ Public | $t(U, \Sigma b_j S_j)$ |
| Second | Encryption "gID" | $Q_{ID_i}$ Public | $P_{pub}$ Public | $\sigma$ Private | $\hat{t}\hat{e}(Q_{ID_i}, P_{pub})$ |
| | Decryption "x" | $d_{ID_i}$ Private $Q_{ID_i}$ in $d_{ID_i}$ | $s_j$ in $d_{ID_i}$ | $U$ Public | $\hat{e}(\Sigma d_{ID_i}, U)$ |
| Third | Signature (compound) | $d_{ID_i}$ Private | $P_{pub}$ Public | $z$ Private | $h \Sigma d_{ID_i} + z \Sigma P_{pub}$ |
| | Verification (compound) | $Q_{ID_i}$ Public | $P_{pub}, U$ Public | $U$ Public | $\hat{t}\hat{e}(P_{pub}, hQ_{ID_i} + U)$ |
| Fourth | Signature "e" | $d_{ID_i}$ Private $Q_{ID_i}$ in $d_{ID_i}$ | $s_j$ in $d_{ID_i}$ | $k$ Private | $\hat{e}(\Sigma d_{ID_i}, P)$ |
| | Verification "e" | $Q_{ID_i}$ Public | $P_{pub}$ Public | $h, S$ Public | $\hat{t}(Q_{ID_i}, P_{pub})$ |

OTHER PUBLICATIONS

Hess, Florian. "Efficient Identity Based Signature Schemes Based on Pairings", 9th Annual International Workshop, SAC 2002 St. John's Newfoundland, Canada, Aug. 15-16, 2002.*

Horwitz, J., et al., "Toward Hierarchical Identity-Based Encryption," *EUROCRYPT 2002*, LNCS 2332, pp. 466-481 (2002).

Boneh, D., et al., "Identity-Based Encryption from the Weil Pairing," *Advances in Cryptology—CRYPTO 2001*, LNCS 2139, pp. 213-229, Springer-Verlag (2001).

Frey, G., et al., "The Tate Pairing and the Discrete Logarithm Applied to Elliptic Curve Cryptosystems," *IEEE Transactions on Information Theory*, vol. 45, No. 5, pp. 1717-1719 (1999).

European Office Action for EP30 254 262.3 (Mar. 18, 2004).

Response to European Office Action for EP3 02 54 262.3 (Jun. 28, 2004).

Shamir, A, "How to Share a Secret," Nick Szabo's Papers and Concise Tutorials, (Jun. 25, 2004).

* cited by examiner

| Embodiment | Key Type | Identity Element | TA Element | Session Element | General Form |
|---|---|---|---|---|---|
| First | Encryption "Enc" | $Q_{IDi}$ Public | $R_{TAi}$ Public | $r$ Private | $\prod t(R_{TAi}, rQ_{IDi})$ |
| First | Decryption "Dec" | $S_i$ Private; $Q_{IDi}$ in $S_i$ | $s_i$ in $S_i$ | $U$ Public | $t(U, \sum b_i S_i)$ |
| Second | Encryption "gID" | $Q_{IDi}$ Public | $P_{pubi}$ Public | $\sigma$ Private | $\prod \hat{e}(Q_{IDi}, P_{pubi})$ |
| Second | Decryption "x" | $d_{IDi}$ Private; $Q_{IDi}$ in $d_{IDi}$ | $s_i$ in $d_{IDi}$ | $U$ Public | $\hat{e}(\sum d_{IDi}, U)$ |
| Third | Signature (compound) | $d_{IDi}$ Private | $P_{pubi}$ Public | $z$ Private | $h \sum d_{IDi} + z \sum P_{pubi}$ |
| Third | Verification (compound) | $Q_{IDi}$ Public | $P_{pubi}, U$ Public | $U$ Public | $\prod \hat{e}(P_{pubi}, hQ_{IDi} + U)$ |
| Fourth | Signature "e" | $d_{IDi}$ Private; $Q_{IDi}$ in $d_{IDi}$ | $s_i$ in $d_{IDi}$ | $k$ Private | $\hat{e}(\sum d_{IDi}, P)$ |
| Fourth | Verification "'e'" | $Q_{IDi}$ Public | $P_{pubi}$ Public | $h, S$ Public | $\prod \hat{e}(Q_{IDi}, P_{pubi})$ |

Figure 3

METHOD AND APPARATUS FOR GENERATING A CRYPTOGRAPHIC KEY

FIELD OF THE INVENTION

The present invention relates to a method and apparatus for generating a cryptographic key.

BACKGROUND OF THE INVENTION

An important feature associated with cryptography is the provision of a trusted authority, where a trusted authority is responsible for issuing private and public keys to appropriate individuals/entities. However, as a private key, is by its nature, private to a specific individual/entity it is essential that a user can trust that the trusted authority will not disclose or otherwise use the user's private key in an inappropriate manner. However, it can be difficult for a user to build a strong trust relationship with a single trusted authority.

One solution to this problem has involved the use of a plurality of trusted authorities to generate individual parts of a private key, where no one trusted authority has access to the complete private key. In particular, one solution involves the use of a shared secret in which a group of trusted authorities use the shared secret to generate their portion of the private key. However, this solution requires the use of a trusted secret distributor.

Another solution involves each trusted authority providing a portion of a private key based upon the identity of the user where the identity of the user is the same for each trusted authority. However, in many applications a user may have different identities when dealing with the different trusted authorities.

It is desirable to improve this situation.

Embodiments of the present invention to be described hereinafter make use of cryptographic techniques using bilinear mappings. Accordingly, a brief description will now be given of certain such prior art techniques.

In the present specification, $G_1$ and $G_2$ denote two algebraic groups of prime order q in which the discrete logarithm problem is believed to be hard and for which there exists a computable bilinear map p, for example, a Tate pairing t or Weil pairing ê. Thus, for the Weil pairing:

$$ê: G_1 \times G_1 \rightarrow G_2$$

where $G_2$ is a subgroup of a multiplicative group of a finite field. The Tate pairing can be similarly expressed though it is possible for it to be of asymmetric form:

$$t: G_1 \times G_0 \rightarrow G_2$$

where $G_0$ is a further algebraic group the elements of which are not restricted to being of order q. Generally, the elements of the groups $G_0$ and $G_1$ are points on an elliptic curve though this is not necessarily the case. For convenience, the examples given below assume the elements of $G_0$ and $G_1$ to be points on an elliptic curve and use a symmetric bilinear map (p: $G_1 \times G_1 \rightarrow G_2$); however, these particularities, are not to be taken as limitations on the scope of the present invention.

As is well known to persons skilled in the art, for cryptographic purposes, a modified form of the Weil pairing is used that ensure p (P,P)≠1 where P ∈ $G_1$; however, for convenience, the pairing is referred to below simply by its usual name without labeling it as modified. Further background regarding Weil and Tate pairings and their cryptographic uses can be found in the following references:

G. Frey, M. Müller, and H. Rück. The Tate pairing and the discrete logarithm applied to elliptic curve cryptosystems. *IEEE Transactions on Information Theory*, 45(5): 1717-1719, 1999.

D. Boneh and M. Franklin. Identity based encryption from the Weil pairing. In *Advances in Cryptology—CRYPTO 2001*, LNCS 2139, pp. 213-229, Springer-Verlag, 2001.

For convenience, the examples given below assume the use of a symmetric bilinear map (p. $G_1 \times G_1 \rightarrow G_2$) with the elements of $G_1$ being points on an elliptic curve; however, these particularities, are not to be taken as limitations on the scope of the present invention.

As the mapping between $G_1$ and $G_2$ is bilinear exponents/multipliers can be moved around. For example if a, b, c ∈ $F_q$ and P, Q ∈ $G_1$ then $$t(aP, bQ)^c = t(aP, cQ)^b = t(bP, cQ)^a = t(bP, aQ)^c = t(cP, aQ)^b = t(cP, bQ)^a$$
$$= t(abP, Q)^c = t(abP, cQ) = t(P, abQ)^c = t(cP, abQ)$$
$$= \ldots$$
$$= t(abcP, Q) = t(P, abcQ) = t(P, Q)^{abc}$$

Additionally, the following cryptographic hash functions are defined:

$$H_1: \{0,1\}^* \rightarrow G_1$$

$$H_2: \{0,1\}^* \rightarrow F_q$$

$$H_3: G_2 \rightarrow \{0,1\}^*$$

A normal public/private key pair can be defined for a trusted authority:

the private key is s where s ∈ $F_q$ the public key is (P, R) where P ∈ $G_1$ and R ∈ G1, with R=sP Additionally, an identifier based public key/private key pair can be defined for a party with the cooperation of the trusted authority. As is well known to persons skilled in the art, in "identifier-based" cryptographic methods a public, cryptographically unconstrained, string is used in conjunction with public data of a trusted authority to carry out tasks such as data encryption or signing. The complementary tasks, such as decryption and signature verification, require the involvement of the trusted authority to carry out computation based on the public string and its own private data. Frequently, the string serves to "identify" the intended message recipient and this has given rise to the use of the label "identifier-based" or "identity-based" generally for these cryptographic methods. However, depending on the application to which such a cryptographic method is put, the string may serve a different purpose to that of identifying the intended recipient and, indeed, may be an arbitrary string having no other purpose than to form the basis of the cryptographic processes. Accordingly, the use of the term "identifier-based" herein in relation to cryptographic methods and systems is to be understood simply as implying that the methods and systems are based on the use of a cryptographically unconstrained string whether or not the string serves to identify the intended recipient. Furthermore, as used herein the term "string" is simply intended to imply an ordered series of bits whether derived from a character string, a serialized image bit map, a digitized sound signal, or any other data source.

In the present case, the identifier-based public/private key pair defined for the party has a public key $Q_{ID}$ and private key $S_{ID}$ where $Q_{ID}$, $S_{ID} \in G_1$. The trusted authority's normal public/private key pair (P,R/s) is linked with the identifier-based public/private key by $$S_{ID} = sQ_{ID} \text{ and } Q_{ID} = H_1(ID)$$

where ID is the identifier string for the party.

Figure 1:
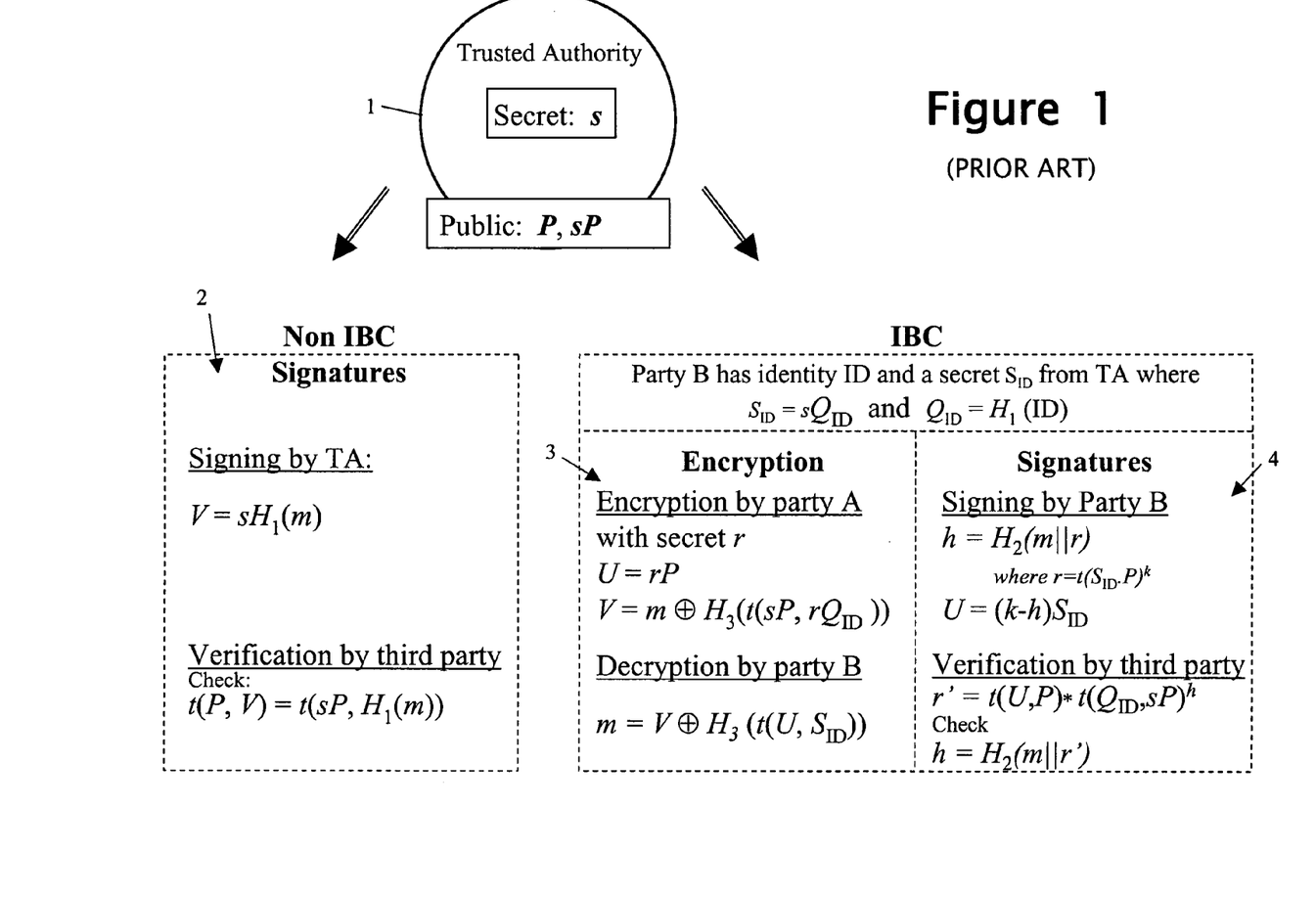
FIG. 1 is a diagram showing prior art cryptographic processes based on elliptic curve cryptography using Tate pairings.

Some typical uses for the above described key pairs will now be given with reference to FIG. 1 of the accompanying drawings that depicts a trusted authority 10 with a public key (P, sP) and a private key s. A party A serves as a general third party whilst for the identifier-based cryptographic tasks (IBC) described, a party B has an IBC public key $Q_{ID}$ and an IBC private key $S_{ID}$.

Standard Signatures (see dashed box 2): The holder of the private key s (that is, the trusted authority 1 or anyone to whom the latter has disclosed s) can use s to sign a bit string; more particularly, where m denotes a message to be signed, the holder of s computes:

$$V = sH_1(m).$$

Verification by party A involves this party checking that the following equation is satisfied:

$$t(P, V) = t(R, H_1(m))$$

This is based upon the mapping between $G_1$ and $G_2$ being bilinear exponents/multipliers, as described above. That is to say, $$\begin{aligned} t(P, V) &= t(P, sH_1(m)) \\ &= t(P, H_1(m))^s \\ &= t(sP, H_1(m)) \\ &= t(R, H_1(m)) \end{aligned}$$

Identifier-Based Encryotion (see dashed box 3):—Identifier based encryption allows the holder of the private key $S_{ID}$ of an identifier based key pair (in this case, party B) to decrypt a message sent to them encrypted (by party A) using B's public key $Q_{ID}$.

More particularly, party A, in order to encrypt a message m, first computes:

$$U = rP$$

where r is a random element of $F_q$. Next, party A computes:

$$V = m \oplus H_3(t(R, rQ_{ID}))$$

Party A now has the ciphertext elements U and V which it sends to party B.

Decryption of the message by party B is performed by computing:

$$\begin{aligned} V \oplus H_3(t(U, S_{ID})) &= V \oplus H_3(t(rP, sQ_{ID})) \\ &= V \oplus H_3(t(P, Q_{ID})^{rs}) \\ &= V \oplus H_3(t(sP, rQ_{ID})) \\ &= V \oplus H_3(t(R, rQ_{ID})) \\ &= m \end{aligned}$$

Identifier-Based Signatures (see dashed box 4):—Identifier based signatures using Tate pairing can be implemented. For example:

Party B first computes:

$$r = t(S_{ID}, P)^k$$

where k is a random element of $F_q$.

Party B then apply the hash function $H_2$ to m∥r (concatenation of m and r) to obtain:

$$h = H_2(m\|r).$$

Thereafter party B computes $$U = (k - h)S_{ID}$$

thus generating the output U and h as the signature on the message m.

Verification of the signature by party A can be established by computing:

$$r' = t(U, P) \cdot t(Q_{ID}, R)^h$$

where the signature can only be accepted if $h = H_2(m\|r')$.

SUMMARY OF THE INVENTION

In accordance with a first aspect of the present invention there is provided a computer apparatus comprising a processor arranged to generating a cryptographic key using a first data set that corresponds to a first identifier, a second data set that corresponds to a first trusted party's public key, a third data set that corresponds to a second identifier and a fourth data set corresponds to a second trusted party's public key.

The cryptographic key is, for example, one of an encryption key, a decryption key, a signature key and a verification key, and is preferably generated by applying Tate or Weil bilinear mappings to the data sets.

In accordance with a second aspect of the present invention there is provided a method comprising generating a cryptographic key using a first data set that corresponds to a first identifier, a second data set that corresponds to a first trusted party's public key, a third data set that corresponds to a second identifier and a fourth data set that corresponds to a second trusted party's public key.

In accordance with a third aspect of the present invention there is provided a computer system comprising a first computer entity arranged to generate a first data set that corresponds to a first trusted party's public key; a second computer entity arranged to generate a second data set that corresponds to a second trusted party's public key; and a third computer entity arranged to generate a cryptographic key using a first identifier in conjunction with the first data set and a second identifier in conjunction with the second data set.

In accordance with a fourth aspect of the present invention there is provided a method of generating a cryptographic key wherein a bilinear mapping function is used to process multiple data sets each comprising data related to a respective association of trusted authority and user identity.

In one implementation the cryptographic key is an encryption key with each data set comprising an identity-based public key derived from said user identity, and a public key element of the trusted authority that is based on a secret of the latter. In another implementation, the cryptographic key is a decryption key, each data set comprising an identity-based private key derived from said user identity and a secret of the trusted authority. In a further implementation, the cryptographic key is a signature key, each data set comprising an identity-based private key derived from said user identity and a secret of the trusted authority. In a still further implementation, the cryptographic key is a verification key, each data set comprising an identity-based public key derived from said user identity, and a public key element of the trusted authority that is based on a secret of the latter.

At least two of the data sets may relate to different user identities and/or different trusted authorities. Where multiple trusted authorities are involved, these authorities may be associated with different elements to which said bilinear mapping function can be applied, each trusted authority having an associated public key formed from its associated element and a secret of that trusted authority.

The present invention also encompasses computer program products for implementing the foregoing method and apparatus of the invention.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Four embodiments of the invention are described below, all of which are based on bilinear mappings applied to points on an elliptic curve. The first embodiment uses Tate pairings for which the notations and definitions given in the introductory portion of the present specification also apply. The second, third and fourth embodiments are based on Weil pairings and use notations and definitions given in the description of those embodiments. It will be appreciated that other suitable pairings can alternatively be used and that the generalisations noted above with respect to the cryptographic usages of bilinear maps also apply to implementation of the present invention.

Figure 2:
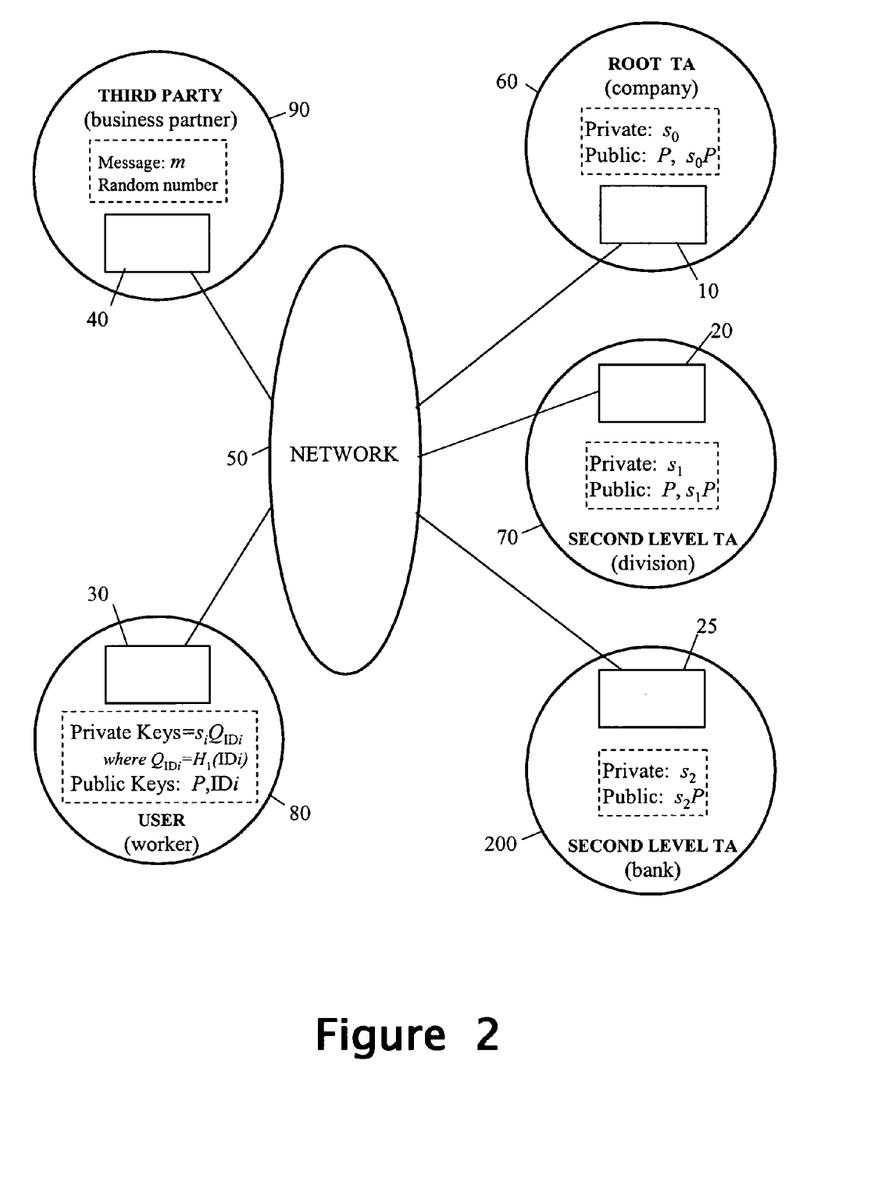
FIG. 2 is a diagram illustrating a system with multiple trusted authorities that is used in first, second, third and fourth embodiments of the invention.

For convenience, all four embodiments use the same computer network system that is illustrated in FIG. 2. More particularly, FIG. 2 shows a first computer entity 10, a second computer entity 20, a third computer entity 25, a fourth computer entity 30, and a fifth computer entity 40 connected via a network 50, for example the Internet. The first computer entity 10 represents a first trusted authority 60, for example a company, the second computer entity 20 represents a second trusted authority 70, for example a division within the company, and the third computer entity 25 represents a third trusted authority 200, for example a bank acting for the company; the second and third trusted authorities 70, 200 are thus both second-level trusted authorities with the same root trusted authority 60. The fourth computer entity 30 represents a user 80, for example a worker within the company. The fifth computer entity 40 represents, for example, a business partner 90 of the company that wishes to interact with the user 80.

The first, second, third, fourth and fifth computer entities 10, 20, 25, 30, 40 are conventional program-controlled computing devices though specialised hardware may be provided to effect particular cryptographic processes.

The root trusted authority 60 has a standard public key (P, $s_0P$)/private key $s_0$ key pair where $s_0$ is a random secret and P is an element of $G_1$ (as indicated above, the elements of $G_1$ are, for the described embodiments, points on an elliptic curve). The second-level trusted authorities 70 and 200 have their own respective random secrets $s_1$ and $s_2$ and use the same point P as the root authority 60 to form respective standard public/private keys pairs: (P, $s_1P$)/$s_1$ and (P, $s_2P$)/$s_2$.

The network 50 could include additional second-level trusted authorities, giving n such authorities in total. However, for the purposes of the present embodiment only two second-level trusted authorities will be considered. In a more general case, the trusted authorities can be totally independent to each other and there is no need for any business relationship to exist between the trusted authorities, in fact the trusted authorities do not need to know each other. For example the trusted authorities may not belong to the same root trusted authority. Indeed, one or more of the trusted authorities could be a root authority.

The user 80 has an independent identity associated with each second-level trusted authority 70, 200, namely an identity IDi $\in \{0,1\}^*$ where i=1, . . . n with the corresponding second-level authority TAi; in the present example, n=2 with TA1 being the authority 70 and TA2 the authority 200 Thus, the user 80 has an identity ID1, for example the user's name 'Bob', with the trusted authority 70 and another identity ID2, for example the name of the company the user 80 works for, with the trusted authority 200.

Each independent identity IDi corresponds to a public key of the user 80. Each second-level trusted authority 70, 200 provides the user with a private key corresponding to the user's public key with that authority, this private key being $s_j Q_{IDi}$ where $s_j$ is the secret of the trusted authority concerned and =$H_1$(IDi).

As will be described below, to send an encrypted message to the user 80 the business partner 90 encrypts the message with a combination of the user's public keys associated with the respective second-level trusted authorities 70, 200 (i.e. the user's identities associated with the respective trusted authorities) and the respective trusted authority's public key. To recover the encrypted message the user 80 decrypts the message with the user's corresponding private key.

To sign a message a user 80 uses its private keys. To verify the signature a verifier uses a combination of the trusted authority's public key with the user's corresponding public keys.

FIRST EMBODIMENT

Considering now the details of the first embodiment, this embodiment uses Tate pairings. In this embodiment, the public key element $s_iP$ of each second-level trusted authority is designated $R_{TAi}$ and the user's identity based private key $s_j Q_{IDi}$ is designated $S_i$ where i=1, . . . n (n being 2 for the FIG. 2 example).

To allow the business partner 90 to encrypt a message m $\in \{0,1\}^n$ for the user 80 based upon the independent identities associated with each second-level trusted authority 70, 200 the business partner 90 generates ciphertext V and U, where:

$$V = m \oplus H_3 \Pi_{1 \leq i \leq 2} t(R_{TAi}, rQ_{IDi})$$

and $$U = rP$$

where r is a random number selected by the business partner 90. In the general case with the business partner using public keys associated with n trusted authorities, the range of i is from 1 to n (rather than from 1 to 2 as in the example given above). It will be appreciated that where the number of trusted authorities in respect of which the user 80 has a respective identity and corresponding private key $S_i$ is greater than 2, the business partner can choose to use the public keys $R_{TAi}$, $Q_{IDi}$ associated with a subset of these trusted authorities when encrypting the message—in other words, there is no requirement to involve all the trusted authorities, but only those considered relevant by the business partner. This can be expressed by introducing an n bit string:

$$b=(b_1 \ldots, b_n)$$

where the '0' or '1' value of bit i of the string indicates the non-use or use of the public keys associated with the corresponding trusted authority in encryption of the message m. The computation of V can now be generalized to $$V=m \oplus H_3 \Pi_{1 \leq i \leq n} t(R_{TAi}, rQ_{IDi})^{b_i}$$

Decryption is performed by computing:

$$m=V \oplus H_3 t(U, \Sigma_{1 \leq i \leq n} b_i S_i)$$

with n being equal to 2 in the present example (and $b_1=1$ and $b_2=1$). Accordingly, message m can only be decrypted with knowledge of both private keys $S_1$, $S_2$.

The equivalence of:

| | | |
|---|---|---|
| the encryption element: | $\Pi_{1 \leq i \leq n} t(R_{TAi}, rQ_{IDi})^{b_i}$ | ("Enc") |
| and the decryption element: | $t(U, \Sigma_{1 \leq i \leq n} b_i S_i)$ | ("Dec") | is readily demonstrated. For example, starting with the encryption element Enc $$\prod_{1 \leq i \leq n} t(R_{TAi}, rQ_{IDi})^{b_i} = \prod_{1 \leq i \leq n} t(s_i P, rQ_{IDi})^{b_i}$$

$$= \prod_{1 \leq i \leq n} t(rP, s_i Q_{IDi})^{b_i}$$

$$= t\left(rP, \sum_{1 \leq i \leq n} b_i s_i Q_{IDi}\right)$$

$$= t\left(U, \sum_{1 \leq i \leq n} b_i s_i Q_{IDi}\right)$$

$$= t\left(U, \sum_{1 \leq i \leq n} b_i S_i\right)$$

which is the decryption element Dec.

SECOND EMBODIMENT

This embodiment uses Weil pairings and allows the business partner to send an encrypted message to the user 80. To avoid over-complicating this embodiment, it will be assumed that all n trusted authorities that have issued private keys to the user 80 are involved so that the use of the string b introduced above in respect of the first embodiment can be omitted; however, it is to be understood that a subset of the n trusted authorities can be used rather than all n authorities.

The elliptic curve E used in this embodiment is defined by $y^2=x^3+1$ over $F_p$ and the point P is an arbitrary point on the elliptic curve where $P \in E/F_p$ of order q, and p is a large (at least 512-bits) prime such that $p=2 \mod 3$ and $p=6q-1$ for some prime $q>3$. This embodiment uses the hash functions:

$$H_1: \{0,1\}^* \rightarrow F_p;$$

$$H_2: F_p^2 \rightarrow \{0,1\}^l \text{ for some } l;$$

$$H_3: \{0,1\}^* \times \{0,1\}^* \rightarrow Z^*_q,$$

$$H_4: \{0,1\}^* \rightarrow \{0,1\}^l.$$

In this embodiment, the public key element $s_i P$ of each second-level trusted authority $TA_i$ (i=1, ..., n) is designated $P_{pubi}$ where $s_i \in Z^*_q$. The user's identity based private key $s_i Q_{IDi}$ is designated $d_{IDi}$ where i=1, ... n (n being 2 for the FIG. 2 example).

This embodiment concerns the business partner 90 encrypting a message $m \in \{0,1\}^*$ for the user 80 using the public keys $Q_{IDi}$, $P_{pubi}$ associated with multiple trusted authorities TAi (i=1, ..., n), which the user can only decrypt if the user 80 has the corresponding private keys $d_{IDi}$ (i=1, ..., n), each respectively issued by a trusted authority $TA_i$ (i=1, ..., n) and corresponding to $s_i Q_{IDi}$ (i=1, ..., n) where $Q_{IDi} \in E/F_p$ of order q.

To encrypt a message, m, the business partner 90:
Computes a MapToPoint $(H_1(ID_i))=Q_{IDi}$ (i=1, ..., n) $\in E/F_p$ of order q.
Selects a random number $\sigma \in \{0,1\}^*$.
Computes $r=H_3(\sigma, m)$, where r is a random element that is to be used to ensure only someone with the appropriate private key can decrypt the message, m.
Computes U=rP.
Computes $gID=\Pi_{(1 \leq i \leq n)} \hat{e}(Q_{IDi}, P_{pubi}) \in F_p^2$.
Computes $V=\sigma \oplus H_2(gID^r)$.
Computes $W=m \oplus H_4(\sigma)$.
Sets the ciphertext to be C=(U, V, W).
To decrypt the message, m, the user 80:
Tests $U \in E/F_p$ of order q;
Computes $x=\hat{e}(\Sigma_{(1 \leq i \leq n)} d_{IDi}, U)$;
Computes $\sigma=V \oplus H_2(x)$;
Computes $m=W \oplus H_4(\sigma)$;
Computes $r=H_3(\sigma, m)$;
Checks U=rP.

THIRD EMBODIMENT

This embodiment uses Weil pairings and allows the user to sign a message. To avoid over-complicating this embodiment, it will be assumed that all n trusted authorities that have issued private keys to the user 80 are involved so that the use of the string b introduced above in respect of the first embodiment can be omitted; however, it is to be understood that a subset of the n trusted authorities can be used rather than all n authorities.

The elliptic curve E used in this embodiment is defined by $y^2=x^3+1$ over $F_p$ and the point P is an arbitrary point on the elliptic curve where $P \in E/F_p$ of order q, and p is a large (at least 512-bits) prime such that $p=2 \mod 3$ and $p=6q-1$ for some prime $q>3$. This embodiment uses the following two hash functions:

$$H_1: \{0,1\}^* \rightarrow F_p;$$

$$H_2: \{0,1\}^* \times \{0,1\}^* \rightarrow Z^*_q.$$

In this embodiment, the public key element $s_i P$ of each second-level trusted authority $TA_i$ (i=1, ..., n) is designated $P_{pubi}$ where $s_i \in Z^*_q$. The user's identity based private key $s_i Q_{IDi}$ is designated $d_{IDi}$ where i=1, ... n (n being 2 for the FIG. 2 example).

The user signs a message $m \in \{0,1\}^*$ under a number of private keys $d_{IDi}$ (i=1, ..., n), each respectively issued by a respective trusted authority, i.e. $TA_i$ (i=1, ..., n) corresponding to a public key $Q_{IDi}$ (i=1, ..., n). The business partner 90 verifies the signature by using both the user's public keys corresponding to the signing private keys and the $TA_i$'s public keys.

To sign a message, m, the user 80:
Selects a random $z \in \{0,1\}^*$;
Computes $U=zP$;
Computes $h=H_2(m, U)$;
Computes $V = h\Sigma_{(1 \leq i \leq n)}d_{IDi} + z\Sigma_{(1 \leq i \leq n)}P_{pubi}$
Ships to the business partner m, U and V.

To verify the signature (m, U, V) the business partner 90:
Computes MapToPoint $(H_1(ID_i))=Q_{IDi} \in E/F_p$ of order q;
Computes $h=H_2(m, U)$;
Computes $x=\hat{e}(P, V)$;
Computes $y=\Pi_{(1 \leq i \leq n)}\hat{e}(P_{pubi}, hQ_{IDi}+U)$;
Checks $x=y$.

FOURTH EMBODIMENT

This embodiment uses Weil pairings and also allows the user to sign a message. To avoid over-complicating this embodiment, it will be assumed that all n trusted authorities that have issued private keys to the user 80 are involved so that the use of the string b introduced above in respect of the first embodiment can be omitted; however, it is to be understood that a subset of the n trusted authorities can be used rather than all n authorities.

The elliptic curve E used in this embodiment is defined by $y^2=x^3+1$ over $F_p$ and the point P is an arbitrary point on the elliptic curve where $P \in E/F_p$ of order q, and p is a large (at least 512-bits) prime such that $p=2 \bmod 3$ and $p=6q-1$ for some prime $q>3$. This embodiment uses the following two hash functions:

$$H_1: \{0,1\}^* \to F_p;$$

$$H_2: \{0,1\}^* \times \{0,1\}^* \to Z^*_q.$$

In this embodiment, the public key element $s_iP$ of each second-level trusted authority $TA_i$ (i=1, ..., n) is designated $P_{pubi}$ where $s_i \in Z^*_q$. The user's identity based private key $s_iQ_{IDi}$ is designated $d_{IDi}$ where i=1, ... n (n being 2 for the FIG. 2 example).

The user 80 signs a message $m \in \{0,1\}^*$ under a number of private keys $d_{IDi}$ (i=1, ..., n), each respectively issued by a respective trusted authority i.e. $TA_i$ (i=1, ..., n) corresponding to a public key $Q_{IDi}$ (i=1, ..., n). The business partner 90 verifies the signature by using both the user's public keys corresponding to the signing private keys and the $TA_i$'s public keys.

To sign a message, m, the user 80:
Selects a random $k \in \{0,1\}^n$;
Computes $e=\hat{e}(\Sigma_{(1 \leq i \leq n)}d_{IDi}, P)$;
Computes $r=e^k$;
Computes $h=H_2(m, r)$;
Computes $S=(k-h)\Sigma_{(1 \leq i \leq n)}d_{ID}$;
Ships to the business partner m, h and S.

To verify the signature (m, h, S) the business partner 90:
Computes MapToPoint $(H_1(ID_i))=Q_{IDi} \in E/F_p$ of order q;
Computes $e'=\Pi_{(1 \leq i \leq n)}\hat{e}(Q_{IDi}, P_{pubi})$—may be pre-computed;
Computes $r'=\hat{e}(S, P)e'^h$;
Checks $h=H_2(m, r')$.

Review

Figure 3:
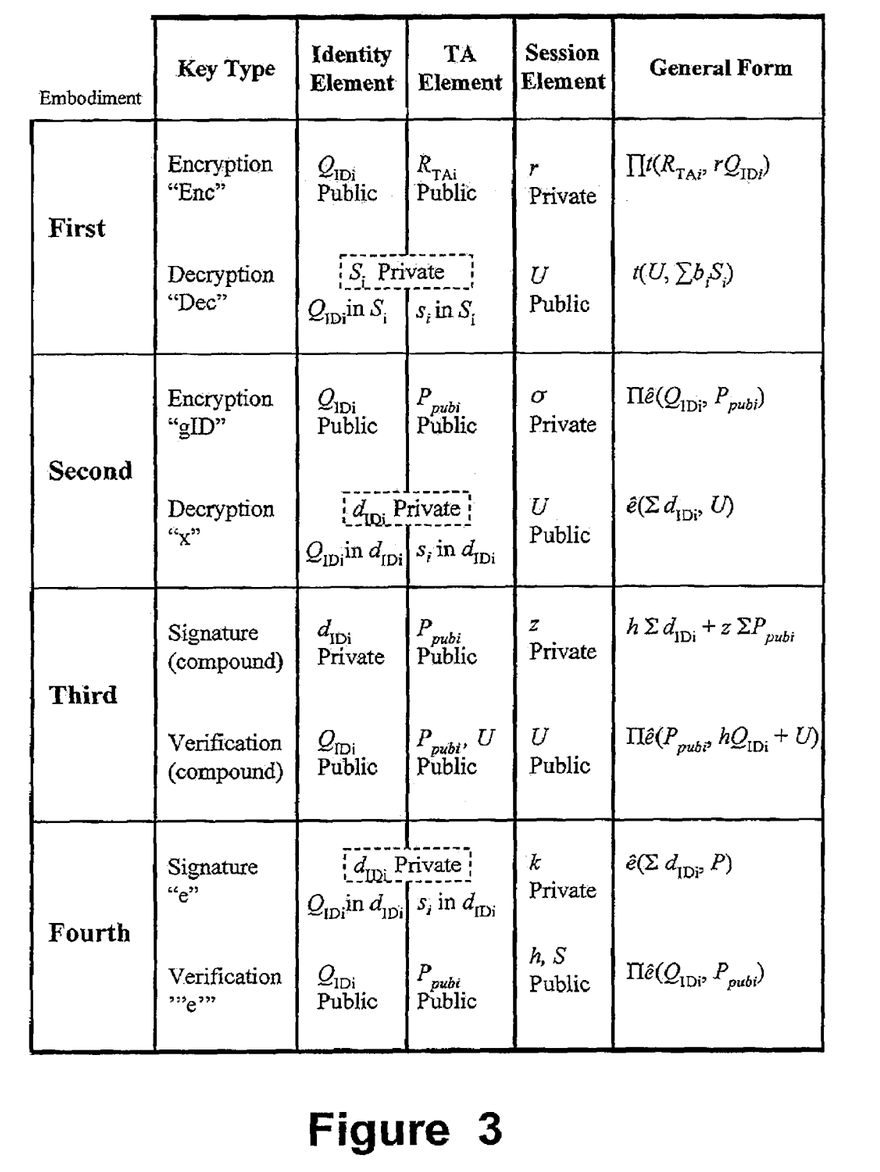
FIG. 3 is a table showing, for each of the described embodiments, various cryptographic elements used.

Each of the four above-described embodiments discloses complementary cryptographic processes (that is, message encryption/decryption or message signature/verification). Each of these processes effectively involves the generation of a corresponding cryptographic key, though in the case of the third embodiment, this key is compound in nature (that is, is composed of more than one operative element). FIG. 3 sets out in tabular form, for each embodiment, the key types involved.

Each cryptographic key is derived from data concerning at least two associations of user identity and trusted authority and FIG. 3 gives for an $i^{th}$ such association, the elements through which the user-identity data and the trusted authority (TA) data is present (the "Identity element" column and the "TA element" column respectively); in effect, for each association, there is a data set formed by data concerning the user identity and trusted authority involved.

Also shown in FIG. 3 is the session element used in each case, typically based on a random number chosen by the message encrypting or signing party.

Finally, the left-hand column in FIG. 3 shows the general form of each key (for simplicity, the range of i and the string b have not been included).

Variants

It will be appreciated that many variants are possible to the above described embodiments. Thus, it would be possible for each of the trusted authorities TA1 to TAn to use a different point P, that is, the general trusted authority TAi uses a point $P_i$ and has a corresponding public key $(P, s_iP_i)$. Appropriate modifications to the above embodiments to take account of this change will be apparent to persons skilled in the art. Thus, for example, in the first embodiment, for message encryption:

$$V=m \oplus H_3\Pi_{1 \leq i \leq n}t(s_iP_i, rQ_{IDi})^{b1}$$

$$U_i=rP_i$$

so that there is now a respective value of U for each trusted authority involved. For message decryption:

$$m=V \oplus H_3\Pi_{1 \leq i \leq n}t(U_i, S_i)^{b1}$$

Of course, both for embodiments where there is a common P and where there is a respective $P_i$ for each trusted authority TAi (i=1, ... n), there are likely to be applications where it possible for the user to use the same identity with every trusted authority and in such cases some simplification becomes possible. Thus, for the first embodiment described above where a common P is used by all trusted authorities, if the user has the same single identity ID with all authorities and $H_1(ID)=Q$, then message encryption can be reduced to:

$$V=m \oplus H_3t(\Sigma_{1 \leq i \leq n}b_is_iP,Q)$$

$$U=rP$$

with the decryption expression being the same as given for the first embodiment. If there is a different $P_i$ for each trusted authority TAi, then encryption becomes $$V=m \oplus H_3t(\Sigma_{1 \leq i \leq n}b_is_iP_i,Q)$$

with the same decryption expression as given above for the case of the user having a different ID with each trusted authority. Similar modifications will be apparent for the second, third and fourth embodiments described above.

Conversely, both for embodiments where there is a common P and where there is a respective $P_i$ for each trusted authority TAi (i=1, ... n), there are likely to be applications where a more complex relationship exists between identities and trusted authorities—not only may a user have multiple identities but each identity may be used with several trusted authorities such that several identities may be used with the same trusted authority. Thus, where there are n trusted authorities TAi (where i=1, ... n) and n identities $ID_i$ (where i=1, ... n; though it may be noted that the value of n need not be the same for trusted authorities and identities), there is a set of atomic pairs (TA$_i$, ID$_j$, i, j=1, ..., n). Taking the case of P being the same for all trusted authorities, each trusted authority has its own standard public key (P, R$_{TAi}$) where R$_{TAi}$=s$_i$P and may provide the user with up to n private keys each based on a respective one of the identities of the user; the generalized user private key is thus:

$S_{ij}=s_iQ_{IDj}$ where $Q_{IDj}=H_1(ID_j)$.

A bit string b=(b$_{11}$, ... b$_{ij}$, ..., b$_{nn}$) can be used to define the absence or presence of a particular private key. Applying this to modify the first embodiment described above, encryption can then be expressed as:

$V=m \oplus H_3 \Pi_{1 \le i,j \le n} t(R_{TAi}, rQ_{IDi})^{b_{ij}}$ $U=rP$ and decryption becomes:

$m=V \oplus H_3 t(U, \Sigma_{1 \le i,j \le n} b_{ij} S_{ij})$

An example application is where Alice and Bob want to open a joint account in a community. They download an application form from the community's web side. Within the form, they are asked for information of their employment and address. They fill the form with the following information: Alice is an employee of company X; Bob is an employee of company Y and both of them are living in town Z. The community sends them an encrypted document giving them community membership. Alice and Bob have to work together to decrypt this document and thereby effectively form a single recipient user. The community chooses 'Alice of Z' and 'Bob of Z' as their IDs respectively; and chooses company X, company Y and the local authority for town Z as trusted authorities. In this application, $Q_1=H$ (Alice of Z), and $Q_2=H_1$(Bob of Z), $R_{TA1}=s_XP$, $R_{TA2}=s_YP$, and $R_{TA3}=s_ZP$, $S_{11}=s_XQ_1$, $S_{22}=s_YQ_2$, $S_{31}=s_ZQ_1$, and $S_{32}=s_ZQ_2$, $b_{11}$, $b_{22}$, $b_{31}$, $b_{32}=1$, $b_{12}$, $b_{21}=0$, Document encryption was by:

$V=m \oplus H_3 \Pi_{1 \le i \le 3, 1 \le j \le 2} t(R_{TAi}, rQ_{IDi})^{b_{ij}}$ $U=rP$ and decryption becomes:

$m=V \oplus H_3 t(U, \Sigma_{1 \le i \le 3, 1 \le j \le 2} b_{ij} S_{ij})$

In the case where there is a respective P$_i$ for each trusted authority TAi (i=1, ... n) and the user has private keys S$_{ij}$, the encryption equations are:

$V=m \oplus H_3 \Pi_{1 \le i,j \le n} t(R_{TAi}, rQ_{IDi})^{b_{ij}}$ $U_i=rP_i$ and decryption becomes:

$m=V \oplus H_3 \Pi_{1 \le i,j \le n} t(U_i, S_{ij})^{b_{ij}}$

Similar modifications for handling S$_{ij}$ will be apparent for the second, third and fourth embodiments described above.

The invention claimed is:

1. A method of generating an identifier-based asymmetric cryptographic key concerning a user with which multiple independent user identities are associated, each user identity being intended for use by a respective trusted authority; the method comprising using computer equipment to apply a bilinear mapping function to process multiple data sets each comprising data related to the user's identity with a respective one of the trusted authorities and data related to a secret held by that trusted authority, the secrets of the trusted authorities being unrelated to each other.

2. A method according to claim 1, wherein the cryptographic key is an encryption key, each data set comprising an identity-based public key derived from said user identity, and a public key element of the trusted authority that is based on the secret of the latter.

3. A method according to claim 2, wherein there are n data sets and the encryption key is generated as:

$$\prod_{1 \le i \le n} p(R_{TAi}, rQ_{IDi})$$

where:
p() is said bilinear mapping function,
Q$_{IDi}$ is the identity-based public key associated with the i$^{th}$ data set,
R$_{TAi}$ is the public key element of the trusted authority associated with the i$^{th}$ data set, and
r is a random number.

4. A method according to claim 1, wherein the cryptographic key is a decryption key, each data set comprising an identity-based private key derived from said user identity and the secret of the trusted authority.

5. A method according to claim 4, wherein there are n data sets and the decryption key is generated as:

$$p\left(U, \sum_{1 \le i \le n} S_i\right)$$

where:
p() is said bilinear mapping function,
Si is the identity-based private key associated with the i$^{th}$ data set, and
U is an based on a random number and an element of a public key of the trusted authority associated with the i$^{th}$ data set.

6. A method according to claim 1, wherein the cryptographic key is a signature key, each data set comprising an identity-based private key derived from said user identity and the secret of the trusted authority.

7. A method according to claim 1, wherein the cryptographic key is a verification key, each data set comprising an identity-based public key derived from said user identity, and a public key element of the trusted authority that is based on the secret of the latter.

8. A method according to claim 6, wherein there are n data sets and the signature key is generated as:

$$p\left(\sum_{(1 \le i \le n)} d_{IDi}, P\right)$$

where:
p() is said bilinear mapping function,
d$_{IDi}$ is the identity-based private key associated with the i$^{th}$ data set, and P is a public key element of the trusted authority associated with the $i^{th}$ data set.

9. A method according to claim 7, wherein there are n data sets and the verification key is generated as:

$$\prod_{(1 \le i \le n)} p(Q_{IDi}, P_{pubi})$$

where:
p() is said bilinear mapping function,
$Q_{IDi}$ is the identity-based public key associated with the $i^{th}$ data set, and
$P_{pubi}$ is the public key element of the trusted authority associated with the $i^{th}$ data set.

10. A method according to claim 1, wherein:
the user identity and trusted authority of each data set are each associated with a respective point on an elliptic curve;
the point associated with the user identity is formed by a map-to-point hash function applied to the user identity, the combination of this point with a secret of the trusted authority forming an identity-based private key; and
the point associated with the trusted authority forms, together with a combination of this point with the secret of the trusted authority, a public key of the trusted authority.

11. A method according to claim 1, wherein the bilinear mapping function pairing is one of a Tate pairing and a Weil pairing.

12. A method according to claim 1, wherein data from the multiple data sets are combined before processing by the bilinear mapping function.

13. A method according to claim 1, wherein data from the multiple data sets are combined after processing by the bilinear mapping function.

14. A computer program product arranged, when installed in computing apparatus, to condition the apparatus for generating an identifier-based asymmetric cryptographic key concerning a user with which multiple independent user identities are associated, each user identity being intended for use by a respective trusted authority, the conditioned apparatus using a bilinear mapping function to process multiple data sets each comprising data related to the user's identity with a respective one of the trusted authorities and data related to a secret held by that trusted authority, the secrets of the trusted authorities being unrelated to each other; data from the multiple data sets being combined either before or after processing by the bilinear mapping function.

15. A computer program product as for generating an identifier-based asymmetric cryptographic key according to claim 14, wherein the cryptographic key is an encryption key, each data set comprising an identity-based public key derived from said user identity, and a public key element of the trusted authority that is based on the secret of the latter.

16. A computer program product for generating an identifier-based asymmetric cryptographic key according to claim 15, wherein there are n data sets and the encryption key is generated as:

$$\prod_{1 \le i \le n} p(R_{TAi}, rQ_{IDi})$$

where:
p() is said bilinear mapping function,
$Q_{IDi}$ is the identity-based public key associated with the $i^{th}$ data set,
$R_{TAi}$ is the public key element of the trusted authority associated with the $i^{th}$ data set, and
r is a random number.

17. A computer program product for generating an identifier-based asymmetric cryptographic key according to claim 14, wherein the cryptographic key is a decryption key, each data set comprising an identity-based private key derived from said user identity and the secret of the trusted authority.

18. A computer program product for generating an identifier-based asymmetric cryptographic key according to claim 17, wherein there are n data sets and the decryption key is generated as:

$$p\left(U, \sum_{1 \le i \le n} S_i\right)$$

where:
p() is said bilinear mapping function,
$S_i$ is the identity-based private key associated with the $i^{th}$ data set, and
U is an element based on a random number and an element of a public key of the trusted authority associated with the $i^{th}$ data set.

19. A computer program product for generating an identifier-based asymmetric cryptographic key according to claim 14, wherein the cryptographic key is a signature key, each data set comprising an identity-based private key derived from said user identity and the secret of the trusted authority.

20. A computer program product for generating an identifier-based asymmetric cryptographic key according to claim 19, wherein there are n data sets and the signature key is generated as:

$$p\left(\sum_{(1 \le i \le n)} d_{IDi}, P\right)$$

where:
p() is said bilinear mapping function,
$d_{IDi}$ is the identity-based private key associated with the $i^{th}$ data set, and
P is a public key element of the trusted authority associated with the $i^{th}$ data set.

21. A computer program product for generating an identifier-based asymmetric cryptographic key according to claim 14, wherein the cryptographic key is a verification key, each data set comprising an identity-based public key derived from said user identity, and a public key element of the trusted authority that is based on the secret of the latter.

22. A computer program product for generating an identifier-based asymmetric cryptographic key according to claim 21, wherein there are n data sets and the verification key is generated as:

$$\prod_{(1 \le i \le n)} p(Q_{IDi}, P_{pubi})$$

where:
   p() is said bilinear mapping function,
   $Q_{IDi}$ is the identity-based public key associated with the $i^{th}$ data set, and
   $P_{pubi}$ is the public key element of the trusted authority associated with the $i^{th}$ data set.

23. A computer program product for generating an identifier-based asymmetric cryptographic key according to claim 14, wherein:
   the user identity and trusted authority of each data set are each associated with a respective point on an elliptic curve;
   the point associated with the user identity is formed by a map-to-point hash function applied to the user identity, the combination of this point with a secret of the trusted authority forming an identity-based private key; and
   the point associated with the trusted authority forms, together with a combination of this point with the secret of the trusted authority, a public key of the trusted authority.

24. A computer program product for generating an identifier-based asymmetric cryptographic key according to claim 14, wherein the bilinear mapping function pairing is one of a Tate pairing and a Weil pairing.

25. The computer program product of claim 14 wherein data from the multiple data sets are combined before processing by the bilinear mapping function.

26. The computer program product of claim 14 wherein data from the multiple data sets are combined after processing by the bilinear mapping function.

27. A computer apparatus for generating an identifier-based asymmetric cryptographic key concerning a user with which multiple independent user identities are associated, each user identity being intended for use by a respective trusted authority, the computer apparatus using a bilinear mapping function to process multiple data sets each comprising data related to the user's identity with a respective one of the trusted authorities and data related to a secret held by that trusted authority, the secrets of the trusted authorities being unrelated to each other.

28. A computer apparatus for generating an identifier-based asymmetric cryptographic key according to claim 27, wherein the cryptographic key is an encryption key, each data set comprising an identity-based public key derived from said user identity, and a public key element of the trusted authority that is based on the secret of the latter.

29. A computer apparatus for generating an identifier-based asymmetric cryptographic key according to claim 28, wherein there are n data sets and the encryption key is generated as:

$$\prod_{1 \leq i \leq n} p(R_{TAi}, rQ_{IDi})$$

where:
   p( ) is said bilinear mapping function,
   $Q_{IDi}$ is the identity-based public key associated with the $i^{th}$ data set,
   $R_{TAi}$ is the public key element of the trusted authority associated with the $i^{th}$ data set, and
   r is a random number.

30. A computer apparatus for generating an identifier-based asymmetric cryptographic key according to claim 27, wherein the cryptographic key is a decryption key, each data set comprising an identity-based private key derived from said user identity and the secret of the trusted authority.

31. A computer apparatus for generating an identifier-based asymmetric cryptographic key according to claim 30, wherein there are n data sets and the decryption key is generated as:

$$p\left(U, \sum_{1 \leq i \leq n} S_i\right)$$

where:
   p() is said bilinear mapping function,
   $S_i$ is the identity-based private key associated with the $i^{th}$ data set, and
   U is an element based on a random number and an element of a public key of the trusted authority associated with the $i^{th}$ data set.

32. A computer apparatus for generating an identifier-based asymmetric cryptographic key according to claim 27, wherein the cryptographic key is a signature key, each data set comprising an identity-based private key derived from said user identity and the secret of the trusted authority.

33. A computer apparatus for generating an identifier-based asymmetric cryptographic key according to claim 32, wherein there are n data sets and the signature key is generated as:

$$p\left(\sum_{(1 \leq i \leq n)} d_{IDi}, P\right)$$

where:
   p() is said bilinear mapping function,
   $d_{IDi}$ is the identity-based private key associated with the $i^{th}$ data set, and
   P is a public key element of the trusted authority associated with the $i^{th}$ data set.

34. A computer apparatus for generating an identifier-based asymmetric cryptographic key according to claim 27, wherein the cryptographic key is a verification key, each data set comprising an identity-based public key derived from said user identity, and a public key element of the trusted authority that is based on the secret of the latter.

35. A computer apparatus for generating an identifier-based asymmetric cryptographic key according to claim 34, wherein there are n data sets and the verification key is generated as:

$$\prod_{(1 \leq i \leq n)} p(Q_{IDi}, P_{pubi})$$

where:
   p() is said bilinear mapping function,
   $Q_{IDi}$ is the identity-based public key associated with the $i^{th}$ data set, and
   $P_{pubi}$ is the public key element of the trusted authority associated with the $i^{th}$ data set.

36. A computer apparatus for generating an identifier-based asymmetric cryptographic key according to claim 27, wherein:

the user identity and trusted authority of each data set are each associated with a respective point on an elliptic curve;

the point associated with the user identity is formed by a map-to-point hash function applied to the user identity, the combination of this point with a secret of the trusted authority forming an identity-based private key; and the point associated with the trusted authority forms, together with a combination of this point with the secret of the trusted authority, a public key of the trusted authority.

37. A computer apparatus for generating an identifier-based asymmetric cryptographic key according to claim 27, wherein the bilinear mapping function pairing is one of a Tate pairing and a Weil pairing.

38. The computer apparatus of claim 27 wherein data from the multiple data sets are combined before processing by the bilinear mapping function.

39. The computer apparatus of claim 27 wherein data from the multiple data sets are combined after processing by the bilinear mapping function.

\* \* \* \* \*